(12) United States Patent
Adameck

(10) Patent No.: US 7,940,305 B2
(45) Date of Patent: May 10, 2011

(54) MOTOR VEHICLE CAMERA DISPLAY APPARATUS AND METHOD

(75) Inventor: Markus Adameck, Lippstadt (DE)

(73) Assignee: Hella KG Hueck & Co., Lippstadt (DE)

( * ) Notice: Subject to any disclaimer, the term of this patent is extended or adjusted under 35 U.S.C. 154(b) by 1481 days.

(21) Appl. No.: 11/311,864

(22) Filed: Dec. 19, 2005

(65) Prior Publication Data
US 2007/0292111 A1   Dec. 20, 2007

(30) Foreign Application Priority Data
Dec. 23, 2004   (DE) .................. 10 2004 062 148

(51) Int. Cl.
*H04N 5/225* (2006.01)

(52) U.S. Cl. ............... 348/207.99; 348/239; 348/333.02

(58) Field of Classification Search ............ 348/207.99, 348/239, 333.01, 333.02
See application file for complete search history.

(56) References Cited

U.S. PATENT DOCUMENTS

| | | |
|---|---|---|
| 5,796,429 A | 8/1998 | Suzuki et al. |
| 6,088,018 A | 7/2000 | DeLeeuw et al. |
| 2004/0150717 A1 | 8/2004 | Page et al. |
| 2004/0201765 A1 | 10/2004 | Gammenthaler |

*Primary Examiner* — Tuan Ho

(74) *Attorney, Agent, or Firm* — Robert C. Haldiman; Husch Blackwell LLP

(57) ABSTRACT

Arrangement for a motor vehicle with a camera and a display device for capturing and displaying an image of the surroundings of the motor vehicle and for displaying graphically representable information, such as for example guide lines, reference texts or the like, with a means for superimposing the image with the information, wherein means for superimposing changes values of the pixels at the points of the image, at which the information is displayed, information pixels, as a function of the values captured by the camera.

6 Claims, 1 Drawing Sheet

MOTOR VEHICLE CAMERA DISPLAY APPARATUS AND METHOD

CROSS-REFERENCE TO RELATED APPLICATIONS

This applications claims the benefit of German Patent Application No. 10 2004 062 148.9, filed 23 Dec. 2004.

BACKGROUND OF THE INVENTION

1. Field of the Invention

The present invention relates to an arrangement for a motor vehicle with a camera and a display device for capturing and displaying an image of the surroundings.

2. Related Art

The invention relates to an arrangement for a motor vehicle with a camera and a display device for capturing and displaying an image of the surroundings of the motor vehicle and for displaying graphically representable information, such as for example guide lines, reference texts or the like, with a means for superimposing the image with the information.

Such an arrangement is known from the specification with the publication number EP 1 452 390 A2. In this arrangement, for example a piece of text may be incorporated as information into the image captured by the camera, which says that the rear door of the motor vehicle is open. The pixels, at which the information is to appear, are overwritten by a preset value in order to make the information visible on the display means. The original values of the captured image are thus lost.

By overwriting the original values at the pixels, some of the captured image is lost and cannot be shown graphically. If an object (for example an obstacle), which is important for orientation of the vehicle driver, is situated at the points of the image, at which the information is introduced into the captured image, the vehicle driver cannot see this object on the display means. This may from time to time be disadvantageous and may lead to injury of the person in the vehicle or to damage to objects in the surroundings of the motor vehicle.

Against the background of the described disadvantage of the state of the art, the object of the invention is to introduce information into the captured image of the surroundings so that it is possible for the observer of the display means to monitor the entire region of the surroundings even after introducing the information.

SUMMARY OF THE INVENTION

This object is achieved in that the means for superimposing changes values of the pixels at the points of the image, at which the information is to be displayed (information pixels), as a function of the values captured by the camera. After changing the values at the information pixels by the means for superimposing, information about the surroundings is retained. The values of the information pixels depend on the original values, so that the observer may also capture the surroundings of the motor vehicle at the points, at which the information has been introduced into the captured image by the means for superimposing. The means for superimposing may change the brightness, the colour and/or the saturation, for example as values of information pixels. The original information or the original values of the pixels may thus be changed reversibly at the information pixels. The change may also be, for example in an inversion of one or various values of the information pixels.

The means for superimposing may change the values of all information pixels by the same amount. Equally however, it is possible that the values of the information pixels are changed by an amount which depends on the values of this information pixel captured by the camera. Colour or brightness changes of different intensity can thus be achieved for every information pixel. Hence, some of the information imported may superimpose the original values intensely or less intensely.

The means for superimposing may advantageously be part of the camera. Furthermore, the means may also be part of an image sensor of the camera. One advantage would then be that the data of the image captured by the camera may be converted directly into an analog signal in the image sensor, which signal is then passed to the display means. The image sensor would thus be able to be used without further components and be able to be connected to an image display means. Only connections for a voltage supply would have to be provided.

Photosensitive elements of the image sensor, to which in each case an information pixel is assigned, may be assigned an initial value for integration indicating the change at the start of a particular integration time during image capture.

Equally, it is possible that after producing a digital image of the surroundings, the values of the information pixels can be changed, in particular by addition or subtraction. Either a fixed brightness value or a fixed colour value are preferably added to the corresponding value of the information pixel.

The coordinates of the information pixel and/or amounts, by which the values of the information pixels may be changed by the means for superimposing, may be stored in the image sensor (internal memory) or in an external memory, for example an EEPROM. Equally, they may be produced by a microcontroller.

In addition to a change in the digitalised image, a change in the analog image signal may also take place. The brightness value at the information pixels may thus preferably be changed. The brightness value may thus in particular be raised or lowered. In an advantageous conversion, the analog signal is thus passed to an electronic switch of the means for superimposing. Starting from there, it then passes to the display means. A microcontroller of the means for superimposing counts the lines of the analog image signal and the position in a line until the information pixel in the analog signal is reached, the value of which is to be changed. The controller now switches the switch so that a fixed voltage value is added to the original signal. This voltage may be positive or negative and hence may increase or lower the value of the original signal. However, the controller may likewise ensure that the original signal is multiplied by a suitable factor (signal) by means of a multiplier.

Equally, it is possible to add an alternating voltage, the basic frequency of which is shifted with respect to the carrier frequency of the analog image signal. Hence, the colour of the corresponding information pixel may be changed.

If an alternating voltage is added to a direct-current portion, both the colour values and the brightness value of the information pixel may be changed at the same time.

The frequency of the signal, with which the analog signal is changed, may be produced by means of an oscillating quartz which controls the image sensor. A fixed delay may be achieved by integration by means of an oscillating circuit (RC element). Only the size of the phase changed must then be set to change the colour value of an information pixel and the signal then obtained added to the original analog image signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

The exemplary embodiment is described in more detail using the drawing. Therein

DETAILED DESCRIPTION OF THE PREFERRED EMBODIMENTS

Figure 1:
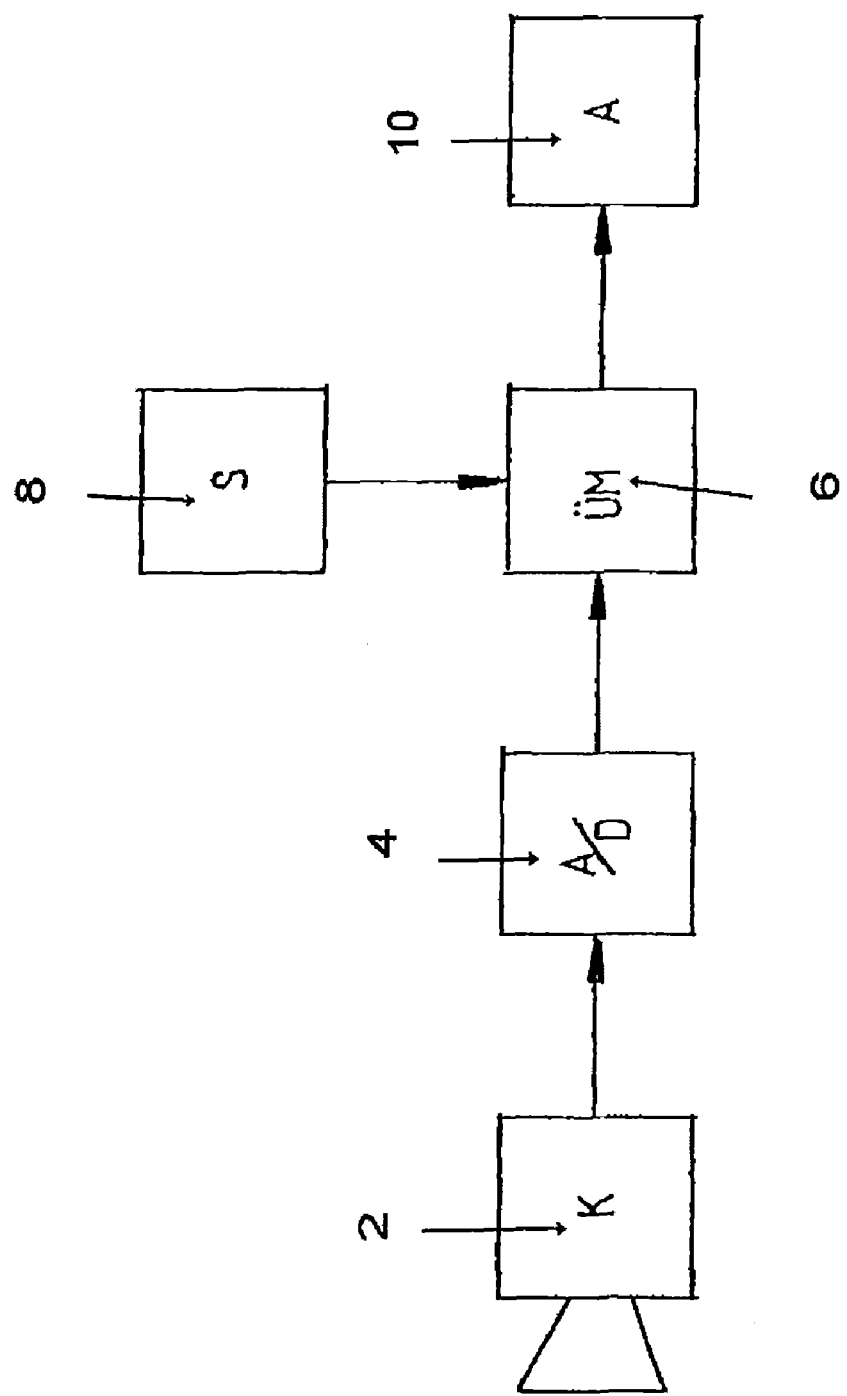
FIG. 1 shows a schematic representation of the arrangement of the invention.

The following description of the preferred embodiment(s) is merely exemplary in nature and is in no way intended to limit the invention, its application, or uses.

The arrangement of the invention shown in FIG. 1 has a camera K 2, an AD converter 4, a means ÜM 6 for superimposing an image captured by the camera with information, a control means S 8 for the transfer means and a display means 10.

The camera K may be attached in the rear region of a motor vehicle in order to capture the rear surroundings of the motor vehicle. In the present case, the camera K is designed as an analog camera, the analog output signal of which is converted to a digital signal in the AD converter. This digital image signal is supplied to the means for superimposing ÜM. The means for superimposing ÜM superimposes the image of the surroundings captured by the camera with information, for example with a text or graphic representations about the direction of travel of the motor vehicle, for example for a given steering lock. The information, with which the captured image is to be superimposed, is supplied to the means ÜM for superimposing by the control means S. The control means S furthermore notifies the means ÜM for superimposing, at which points of the image the information is to be introduced into the image.

Superimposing of the captured image is effected such that the colour of the pixels, at which the information is to be introduced into the image (information pixels), is changed in the direction of yellow. The colour value, or the colour values of the individual information pixels, is thus changed and specifically by reinforcing the yellow portion of the colour signal with simultaneous reduction of the remaining colour portions. This corresponds largely to yellow filtering of the regions of the image, in which the information is to appear. The information becomes visible due to this yellow shift at the information pixels, wherein at the same time the contours of the image of the surroundings captured by the camera are retained and hence are also visible. The image of the surroundings thus superimposed is then made available at the output of the means ÜM for superimposing and passed to the display means A, where is it rendered visible to an observer. The observer may then consider both the information and the image by means of the display means.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A motor vehicle camera and display device for capturing and displaying an image of the surroundings of the motor vehicle and for displaying graphically representable information, comprising:
    a camera, said camera generating original values for each of a plurality of pictures for showing an image depicting the surroundings of the vehicle;
    a processor, said processor configured to generate separate pixel values for graphic information on a display having a plurality of pixels;
    said processor being further configured to superimposed said original values for pixels showing the surroundings of the vehicle and said pixel values for said graphic information such that said image of the vehicle surroundings remains visible through pixels comprising said display of said graphic information, on said multi pixel display.

2. The apparatus of claim 1 wherein said graphic information is guidelines.

3. The apparatus of claim 1 wherein said graphic information is text.

4. The apparatus of claim 1 wherein said super imposition is by adding, subtracting or multiplying pixel values.

5. The apparatus of claim 1 wherein said super imposing is by varying at least one of a color value and a brightness value for each pixel displaying both said graphic information and said original value of the image.

6. The apparatus of claim 1 wherein said super imposing is by varying one of a voltage of a frequency.

* * * * *